Feb. 27, 1951     A. G. GIFFORD     2,543,573

VIBRATION MEASURING DEVICE

Filed May 28, 1946

INVENTOR.

BY Allen G. Gifford

Ralph Hammar
Attorney

Patented Feb. 27, 1951

2,543,573

UNITED STATES PATENT OFFICE 2,543,573

VIBRATION MEASURING DEVICE

Allen G. Gifford, Harborcreek, Pa., assignor to Lord Manufacturing Company, Erie, Pa., a corporation of Pennsylvania Application May 28, 1946, Serial No. 672,876

1 Claim. (Cl. 73—70)

This invention is a device for measuring amplitude and frequency of vibrations which may be made in the form of a rule of vest pocket size. In use the device is held against the vibrating body. The amplitude of vibration is indicated by a scale having a persistence of vision effect. The frequency is indicated by tuning a resilient slide to resonance with the vibrations. Further objects and advantages appear in the specification and claim.

Figure 1:
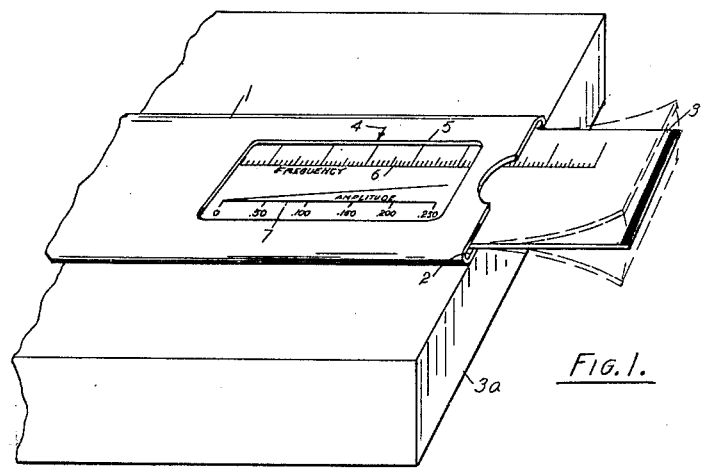
Figure 2:
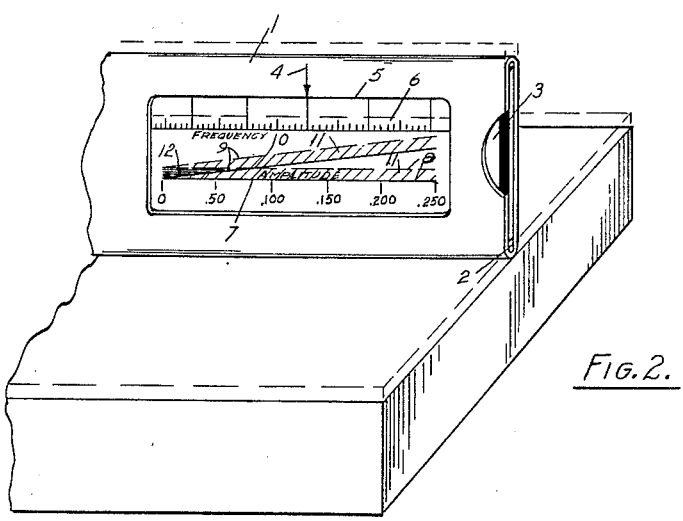

In the drawing, Fig. 1 is a view indicating the measurement of frequency, and Fig. 2 is a view indicating the measurement of amplitude.

Referring to the drawing, 1 indicates a rule like body having a pocket 2 in one end receiving a slide 3. The rule and slide may be made of flexible material such as sheet celluloid.

When used for measuring frequency, the rule is held flat against a vibrating body, indicated at 3a, and the slide is extended until it vibrates at maximum amplitude as indicated by the dotted lines in Fig. 1. The slide is then tuned to resonance with the vibration frequency. This frequency is a function of the length of the slide overhanging the end of the rule. A mark 4 on the rule indicates the vibration frequency on a scale 6 on the slide visible through a window 5 in the rule.

When used for measuring the vibration amplitude, the rule is held edgewise against the vibrating body 3a in line with the direction of vibration. A V-shaped scale 7, due to persistence of vision, assumes the appearance shown in Fig. 2. The horizontal line 8 is marked with graduations indicating the vertical spacing of the inclined line 9. At the uppermost and lowermost positions of the rule as it vibrates with the vibrating body, there is a dwell which causes these positions to appear relatively distinct. The intersection 10 indicates the amplitude of vibration. This can be read on the graduations on the line 8. The location of the intersection 10 is made clearer by the presence of light and dark wedges 11 and 12, the intersection being at the common apex of these wedges.

What I claim as new is:

A flat slide rule like device having a casing adapted to be held flat or edgewise against a vibrating body, a resilient slide in the casing movable out of the casing so the overhanging end has a natural frequency dependent upon the amount of overhang, said casing and slide being provided with a cooperating indicator and scale for translating the amount of overhang of the slide into frequency so that frequency is measured by holding the casing flat against a vibrating body and adjusting the overhang of the slide to resonance, and said device being provided with a scale on a surface thereof in the plane of vibration when the casing is held edgewise against a vibrating body having intersection lines contrasting to said surface, one of these lines being perpendicular to and the other inclined to the direction of vibration whereby the apparent intersection due to persistence of vision is at a position corresponding to the amplitude of vibration.

ALLEN G. GIFFORD.

REFERENCES CITED

The following references are of record in the file of this patent:

UNITED STATES PATENTS

| Number | Name | Date |
|---|---|---|
| 139,912 | Morgan | June 17, 1873 |
| 1,673,949 | Rathbone | June 19, 1928 |
| 1,687,507 | Perkins | Oct. 16, 1928 |
| 2,361,349 | Frazier | Oct. 24, 1944 |

FOREIGN PATENTS

| Number | Country | Date |
|---|---|---|
| 377,492 | Germany | June 20, 1923 |
| 440,319 | Great Britain | Dec. 24, 1935 |